April 6, 1948. F. B. HALFORD 2,438,998
MEANS FOR CONTROLLING THE TEMPERATURE OF GASES
Filed Nov. 1, 1943 4 Sheets-Sheet 1
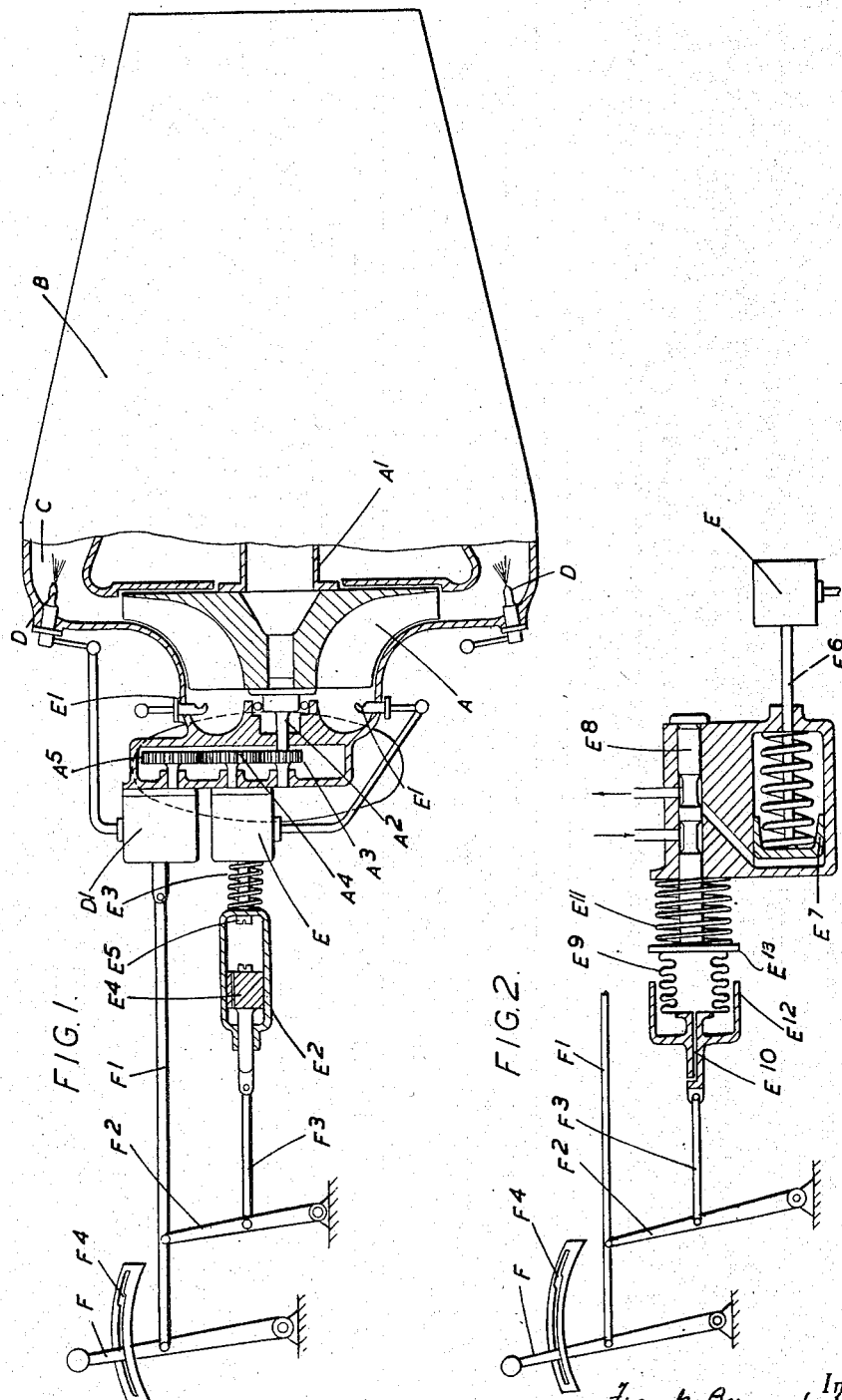

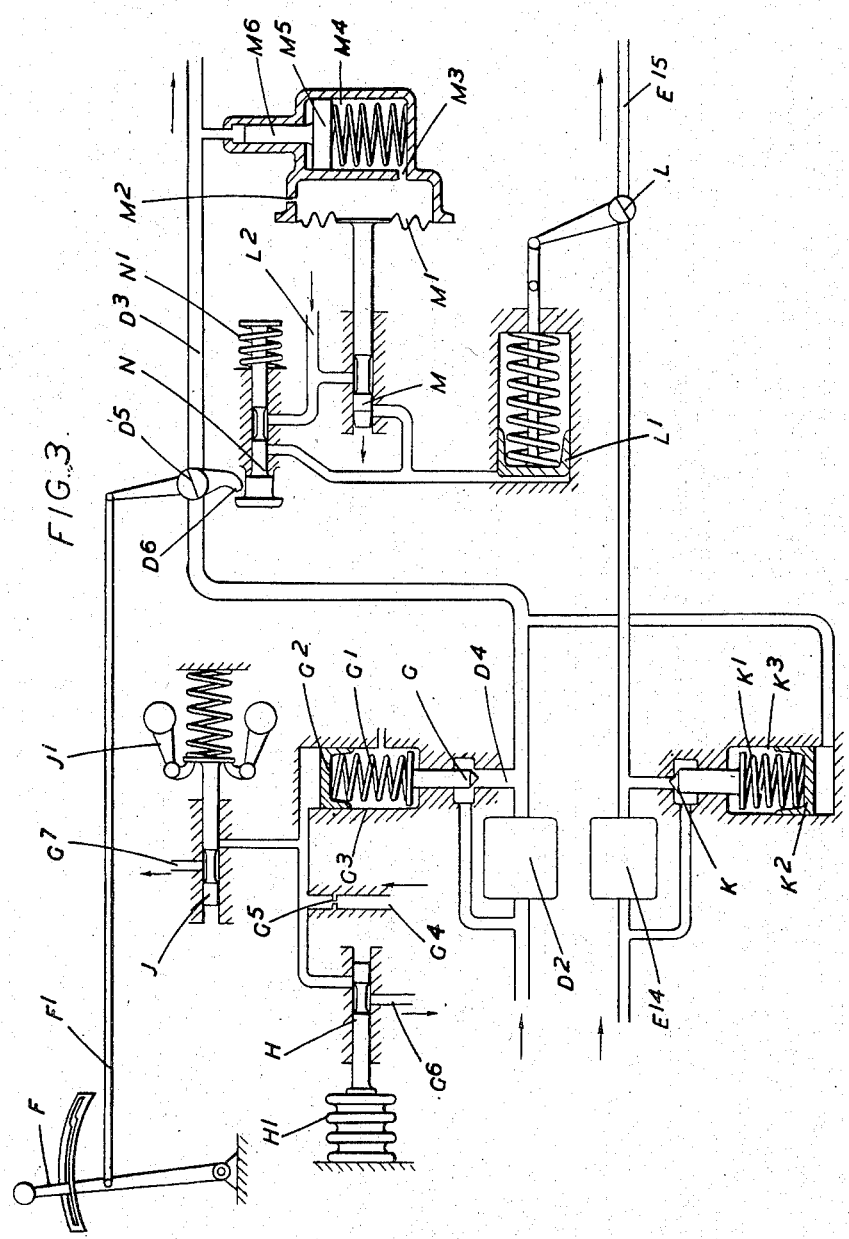

April 6, 1948. F. B. HALFORD 2,438,998
MEANS FOR CONTROLLING THE TEMPERATURE OF GASES
Filed Nov. 1, 1943 4 Sheets-Sheet 3

Frank Bernard Halford Inventor
By
Loyd Hall Sutton
Attorney

April 6, 1948. F. B. HALFORD 2,438,998
MEANS FOR CONTROLLING THE TEMPERATURE OF GASES
Filed Nov. 1, 1943 4 Sheets-Sheet 4

Inventor
Frank Bernard Halford
By
Loyd Hall Sutton
Attorney

Patented Apr. 6, 1948

2,438,998

UNITED STATES PATENT OFFICE 2,438,998

MEANS FOR CONTROLLING THE TEMPERATURE OF GASES

Frank Bernard Halford, Edgware, England, assignor to The De Havilland Aircraft Company Limited, Edgware, England, a company of Great Britain Application November 1, 1943, Serial No. 508,629
In Great Britain September 15, 1942

10 Claims. (Cl. 60—42)

This invention relates to means for controlling the temperature of the gases in a turbo-compressor power unit.

In a power unit of this type in order to prevent overheating of the combustion chamber, turbine blades and other parts it is usually necessary to operate with a fuel-air mixture the strength of which is much weaker than that which would ordinarily be regarded as a correct combustible mixture. It may be said that the temperature of the products of combustion increases roughly in proportion to the strength of the mixture, at least over the range of mixture strengths commonly employed in these power units. When, however, it is desired to get from such a power unit the maximum performance, that is to say the maximum output at full speed and acceleration at lesser speeds it is necessary to increase the strength of the fuel-air mixture and this leads to an undesirable rise in gas temperature which it is the object of the present invention to prevent or reduce.

According to this invention means are provided for introducing a liquid cooling medium, for example water, into the gas stream for the purpose of lowering the temperature of the gases in the power unit the injection of the medium being effected automatically during the operation of the power unit when conditions tend to an undesirable rise in the temperature of the gas or of some part of the apparatus affected by the gas temperature. Thus when the necessity for using a richer fuel mixture occurs and this leads to the temperature of the gases rising above a determined limit, liquid coolant will be injected automatically into the gas stream. The apparatus required may therefore comprise a pump by means of which liquid coolant can be delivered into the gas stream, and means whereby the delivery of coolant by this pump is controlled automatically and in such a way that the delivery will take place only when the temperature of the gases tends to rise above a predetermined limit. For instance the control of the pump which delivers the coolant may be associated with means whereby the fuel supply is controlled so that if the fuel supply is increased rapidly injection of coolant will take place at least for a limited time during acceleration. On the other hand if the fuel supply is increased more slowly it will not result in injection of coolant until the rate of fuel delivery is sufficient to cause an undue rise in the temperature of the gases when the pump will become operative and coolant will be injected. Again the injection of the coolant may be controlled by a thermostatic device in the combustion chamber or some other place that can be regarded as a critical temperature point, and by this device delivery of coolant will be permitted when the temperature of the gases or of the parts at this critical point rises above the determined limit, but the pump will be shut off when the temperature again falls to this limit. In either case the quantity of cooling medium which is delivered may be automatically controlled in accordance with requirements.

While water is the most satisfactory medium to employ for this purpose owing to its high latent heat value, some other fluid may be used if found desirable. The most convenient way of introducing the coolant is in the form of a spray which is directed into the gas stream at a suitable place. Such a place for example may be into the eye of the impeller of the compressor of the power unit, but alternatively the delivery may be directly into the combustion chamber or into each of them if there are several combustion chambers. Again the cooling medium may be delivered on to the turbine rotor or into its interior if the rotor is formed hollow. The pump which delivers the coolant under the necessary pressure is preferably driven by the power unit and the control of the delivery may be effected by by-passing this delivery wholly or in part, or alternatively by the use of a pump of the variable delivery type.

The accompanying drawings illustrate diagrammatically and by way of example certain alternative ways of carrying the invention into practice.

In these drawings—

Figure 1 shows in longitudinal sectional elevation part of a turbo-compressor power unit as employed conveniently for the propulsion of aircraft. In this view is shown one way of introducing the cooling medium at the intake of the compressor with means for controlling the delivery of the cooling medium and also the fuel.

Figure 2 is a view showing an alternative arrangement for a part of the same apparatus wherein a bellows or capsule subject to atmospheric pressure is used to actuate a valve which controls the delivery of liquid cooling medium.

Figure 3 shows diagrammatically another arrangement in which a pump which effects the delivery of the cooling medium is controlled partly or wholly by the pressure in the pipe supplying fuel to the burner nozzles.

Figure 4:
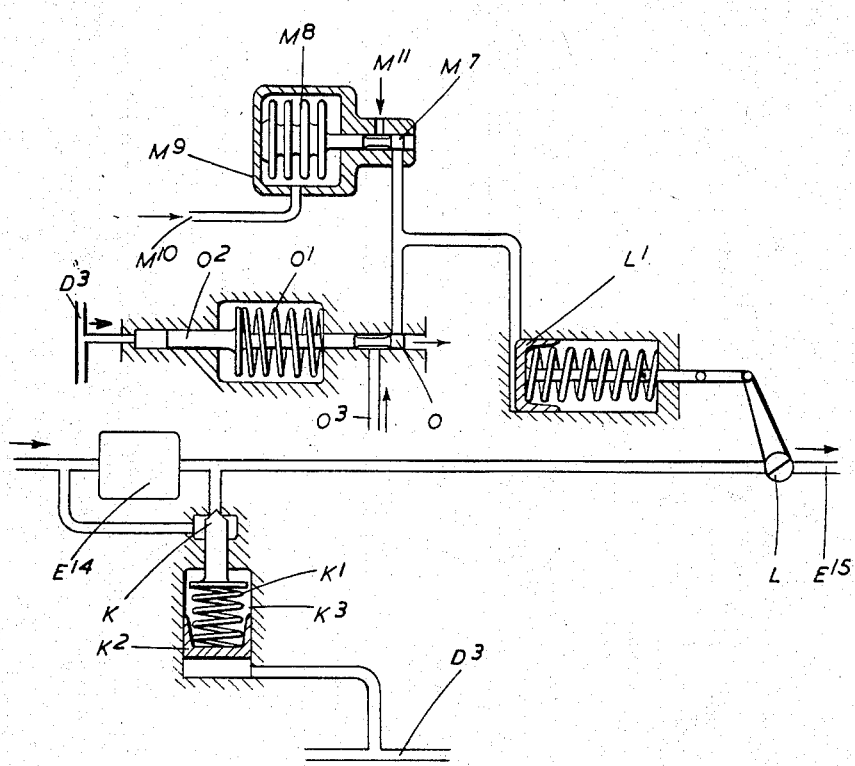
Figure 4 is a diagram showing a means of control alternative to what is illustrated in Figure 3.

Referring to the arrangement shown in Figure 1, the power plant comprises an impeller A which is driven through the hollow shaft $A^1$ by a turbine, not shown, which lies within the casing B. The impeller delivers air into the annular or multiple combustion chamber C into which fuel is sprayed from the jet nozzles D and there burnt, the hot gases passing within the casing B to the blades of the turbine causing its rotation and the driving of the impeller. On the extension $A^2$ of the impeller shaft $A^1$ is a gear wheel $A^3$ through which and gear wheels $A^4$ and $A^5$ are driven a pump E which delivers the cooling medium and a pump $D^1$ which delivers fuel to the jet nozzles D. The output from this fuel pump $D^1$ and thus the power of the plant is controlled by a lever F through a link $F^1$. The cooling medium delivered by the pump E may be water or other suitable liquid of high latent heat to which an anti-freezing substance may be added if required. This coolant is delivered to the jet nozzles $E^1$ which are placed so that the liquid will be sprayed into the air drawn in at the eye of the impeller A. The coolant pump E is controlled also from the lever F through a yielding connection comprising a dashpot $E^2$, the lever $F^2$ and link $F^3$. The dashpot $E^2$ is of ordinary known type and acted on by a spring $E^3$ in such a way that the control rod in the pump is normally drawn fully to the left as seen in the Figure. As here shown ordinary movement of the control lever F to the right will result in an increase in the fuel supplied by the pump $D^1$ to the fuel nozzles D but will not then cause the delivery of any coolant by the pump E to the nozzles $E^1$.

The leak in the dashpot $E^2$ and the spring $E^3$ are so designed that only comparatively rapid movements of the control lever F to the right will cause a corresponding movement of the control rod of the pump E. When such a rapid movement occurs some coolant will be delivered by the nozzles $E^1$ until the spring $E^3$ overcomes the resistance of the dashpot and returns the control rod of the coolant pump to its zero position to the left. Movements of the lever F which are slow enough for the speed of the power unit to respond to without undue delay will not, however, cause delivery of any coolant until the lever F has been moved so far over to the right that the dashpot piston $E^4$ comes up against the end $E^5$ of its cylinder. This will happen when the control lever F has been moved through the gate $F^4$ into its position for maximum output when continuous delivery of some coolant may be necessary until the lever F is again moved back through the gate.

In Figure 2 is shown an alternative method of connecting the control rod $E^6$ of the coolant pump E to the control lever F this connection including a servo motor device by means of which this pump control rod $E^6$ is moved. This servo motor comprises a piston $E^7$ connected to the rod $E^6$ and movable against the action of a spring by pressure liquid admitted under the control of the valve $E^8$ which is connected through a bellows $E^9$ to the link $F^3$. From the interior of the bellows there is a leak hole $E^{10}$ to the atmosphere and a spring $E^{11}$ tends to move the valve $E^8$ to the left and the action of the bellows, which is equivalent to the dashpot previously described, can be overridden and the valve $E^8$ moved when the control lever F has been moved so far as to bring the edge of the cup member $E^{12}$ which surrounds the bellows into contact with the disc $E^{13}$ on the spindle of the valve $E^8$. The bellows device obviates the risk of sticking and the servo gives a power operation of the pump control, but if preferred the servo may be omitted and the control rod $E^6$ actuated directly from the bellows $E^9$.

In some cases it may be convenient or preferable to fill the bellows $E^9$ with liquid as for instance oil through the leak hole $E^{10}$ which is connected to a suitably positioned reservoir containing the liquid. It is in one respect more advantageous to use liquid as it is then possible to more easily regulate the device by the dimensions of the leak hole than when air is used.

In some cases, more particularly where the turbo-compressor power unit is employed for the propulsion of aircraft, the fuel pump output will be subject to various automatic controls in addition to control by the lever F. It may then be preferable to control the operation of the coolant pump partly or even wholly by the pressure of the fuel in the piping leading to the jet nozzles since this will be a direct function of the amount of fuel being used. An arrangement suitable for use in such a case is shown in Figure 3. Both the fuel pump $D^2$ and the coolant pump $E^{14}$ here may be for example of the fixed capacity types. The output from the fuel pump goes partly through the piping $D^3$ to the jet nozzles and is partly by-passed at $D^4$ under control of the valve G. The control of the fuel delivered to the jet nozzles is effected both by a throttle valve $D^5$ actuated by the lever F and by varying the loading of the spring $G^1$ acting on the valve G, the variation in this loading being in accordance with atmospheric pressure. The spring $G^1$ is arranged between the valve G and a piston $G^2$ which can reciprocate in the cylinder $G^3$ and is acted on by the pressure of liquid supplied under a constant pressure at $G^4$ into piping wherein is a constricting orifice $G^5$. The outflow of the pressure liquid at $G^6$ is controlled by the valve H which is actuated by the evacuated capsule $H^1$. The outflow is also controlled at $G^7$ by a valve J actuated by an overspeed governor $J^1$ driven by the power unit so that if the speed of that unit rises above a determined figure the valve J will be moved and by reducing the pressure on the piston $G^2$ will allow the valve G to lift and by-pass some of the fuel thus reducing the supply to the nozzles and bringing down the speed. In an alternative fuel system the barometric capsule $H^1$ may be replaced by a capsule or diaphragm subject to the delivery pressure of the compressor. There will then be a more direct relationship between the pressure of the fuel supplied to the jet nozzles and the pressure of the air supplied to the combustion chamber or chambers wherein these nozzles are situated. Both these types of fuel supply system are known, but mentioned since the present method of controlling the supply of cooling medium may be used with either system.

The pump $E^{14}$, which as mentioned in this case may be of fixed capacity, has its delivery controlled on the one hand by a by-pass valve K acted on by a spring $K^1$ the loading of which can be varied by the pressure in the fuel supply piping $D^3$ acting on the piston $K^2$ movable in the cylinder $K^3$. On the other hand the delivery of coolant through the piping $E^{15}$ is controlled by the throttle valve L actuated by the piston $L^1$ of a servo motor. The flow of pressure liquid through the piping $L^2$ to the servo motor is controlled by two valves of which one M is connected to a diaphragm $M^1$ and the pressure in the chamber behind it determines the position of the valve. This chamber is in communication with the atmosphere by a leak hole $M^2$ and by a passage $M^3$ with a cylinder $M^4$ in which is a spring-loaded differential piston $M^5$, $M^6$. On the part $M^6$ of the piston having the smaller diameter acts the pressure of the fuel in the piping $D^3$. The other valve N controlling the servo motor $L^1$ is acted on by a spring $N^1$ and by an arm $D^6$ of the lever which actuates the fuel supply throttle $D^5$. If desired the chamber behind the diaphragm $M^1$ may be filled with liquid when the leak hole $M^2$ connects with a suitable reservoir of that liquid which may conveniently be oil.

With this arrangement slow variations in fuel pressure will not affect the pressure behind the diaphragm $M^1$, but a rapid increase in the fuel pressure in the piping $D^3$ will cause a correspondingly rapid depression of the piston $M^5$ and a temporary increase in the pressure behind the diaphragm $M^1$ which will cause the valve M to be moved and the servo motor $L^1$ to actuate the valve L thus bringing about a temporary injection of the coolant during acceleration of the power unit.

The fuel controls are so arranged that each position of the lever F corresponds to an approximately constant fuel-air ratio independent of altitude and the object of the valve N is to ensure a continuous supply of coolant when the fuel-air ratio exceeds a certain figure. Normally the valve N is in a position to shut off the supply of pressure liquid to the servo motor $L^1$ and the valve M is just open to drain so as to release any pressure behind the piston of the servo motor. If either of these valves is moved, say to the left as seen in the figure, pressure liquid will be admitted to the servo motor which will move the throttle L and cause an injection of the coolant until the valves have again returned to their normal positions. It is desirable that the maximum rate of injection of the coolant be limited to a certain proportion of the rate of fuel supply or there will be a risk of excessive cooling occurring with the possibility of incomplete evaporation of the cooling medium and consequent damage to the blades of the turbine. In order to attain this the loading of the spring $K^1$ of the relief or by-pass valve K of the coolant pump $E^{14}$ is controlled by the pressure of the fuel in the piping $D^3$ and thus the available coolant pressure is a function of the fuel pressure.

In Figure 4 is shown an alternative arrangement for controlling the delivery of the coolant. The pump $E^{14}$ with pressure relief valve K and throttle L controlling the delivery and actuated by the servo motor $L^1$ are as in the arrangement shown in Figure 3. The supply of pressure liquid to the servo motor for movement of the throttle L is controlled by a valve $M^7$ actuated by a capsule $M^8$ in a chamber $M^9$ which is in communication at $M^{10}$ with the compressor delivery pressure. The servo motor is also controlled by a second valve O acted on by a spring $O^1$ and also by the pressure of the fuel in the supply piping $D^3$ acting on the piston $O^2$. The position of the valve $M^7$ is thus dependent on the compressor pressure independently of fluctuations in the atmospheric pressure, while the position of the valve O is determined by fuel pressure. The operation of the servo motor $L^1$ and the delivery of coolant is thus determined by the positions of the two valves $M^7$ and O, that is to say by compressor and fuel pressures and hence by suitably designing the rate at which the coolant is injected may be made dependent only on the fuel-air ratio which is a function of the fuel and compressor pressures.

The pressure liquid employed to actuate the servo $L^1$ is conveniently lubricating oil which is maintained at constant pressure and supplied at $M^{11}$ where it is controlled by the valve $M^7$, and at $O^3$ where it is controlled by the valve O. The piping leading to the cylinder containing the piston $K^2$ which controls the relief valve K as also the piping leading to the piston $O^2$ controlling the valve O is in communication with the piping $D^3$ containing the supply of fuel under pressure.

Figure 5:
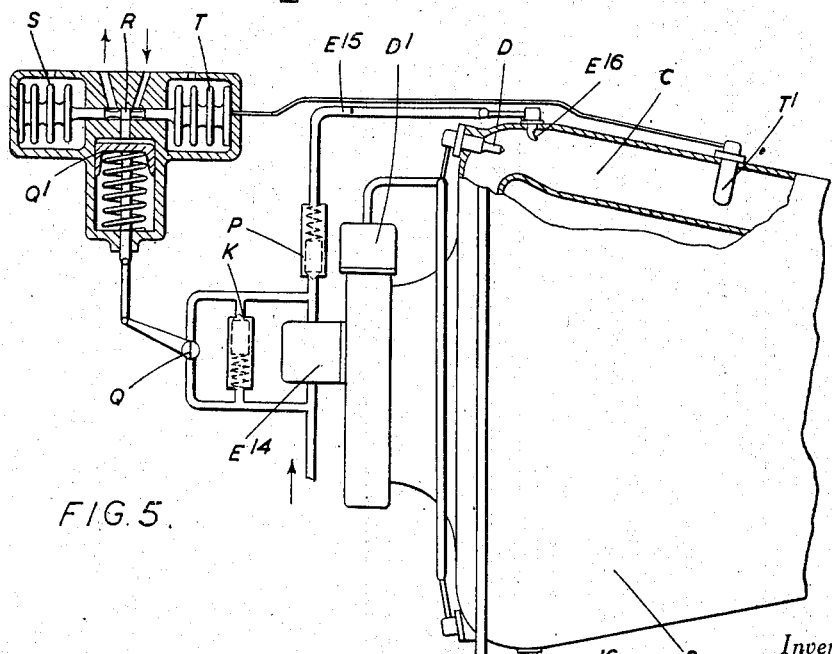
Figure 5 is a part-sectional elevation of a portion of a turbo-compressor showing an arrangement wherein the pump delivering the supply of cooling medium is controlled in accordance with the temperature in the combustion chamber and is independent of the fuel pump.

Referring now to Figure 5, in the arrangement there shown the delivery by coolant pump $E^{14}$, which is of the fixed capacity type, is controlled by the temperature in the combustion chamber C independently of the fuel as supplied by the pump $D^1$. The coolant pump is provided with a spring-loaded valve P in the delivery piping $E^{15}$ and there is a spring-controlled by-pass valve K. There is also a throttle Q controlling a second by-pass and consequently the delivery from this pump, this throttle being actuated by a servo motor piston $Q^1$. A valve R which controls the flow of pressure liquid to and from this servo motor is itself actuated by two capsules S and T, the capsule S being evacuated and in a chamber open to the atmosphere. The capsule T is connected internally to a gas-pressure type of thermostat $T^1$ disposed in the combustion chamber C. If the temperature in this chamber rises above a determined point the rise in the gas pressure in the thermostat will cause movement of the valve R which will result in closing of the by-pass throttle Q by the servo motor $Q^1$ and coolant will be delivered by the pump $E^{14}$ to the nozzles $E^{16}$ in the combustion chamber C.

Instead of the capsules S and T in this arrangement, the control of the delivery of coolant may be effected in accordance with the temperature in the combustion chamber by means of an electric type of pyrometer which may actuate the control valve R of the servo motor by an electromagnet or like device.

Figure 6:
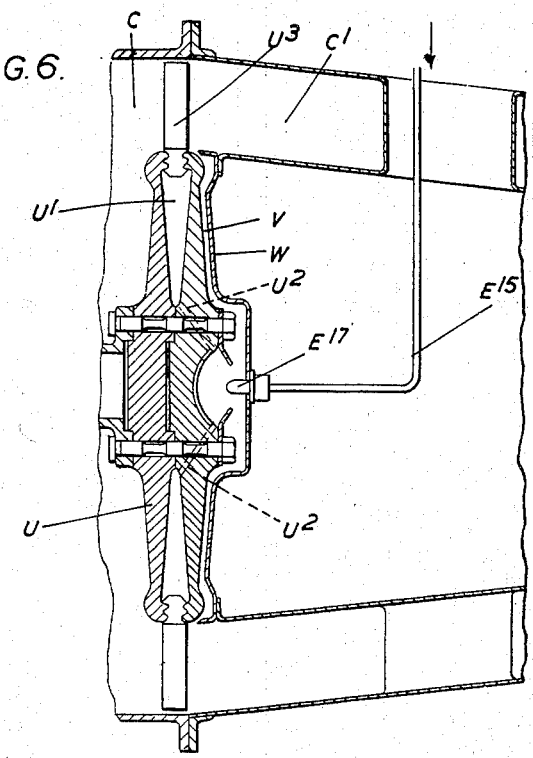
Figure 6 is a longitudinal sectional elevation of a portion of a turbo-compressor plant illustrating the turbine rotor and an arrangement for delivering cooling medium in a manner which will effect a cooling of the turbine rotor.

Figure 6 shows how the coolant supplied under control by any one of the systems described above may be delivered to one or more nozzles $E^{17}$ so as to effect a cooling of the turbine rotor U. In this case the rotor is hollow as at $U^1$ and the coolant from the nozzle $E^{17}$ can pass into this space within the rotor by way of passages $U^2$. Some coolant may also flow over the face of the rotor through the space V between the rotor and the enclosing casing W. The evaporated coolant can issue into the annular passage $C^1$ into which the hot gases pass from the combustion chamber C after flowing over and acting on the blades $U^3$ of the turbine. Such supply of coolant to the turbine rotor may be in addition to or in place of the supply of coolant to the air entering the impeller or directly into the combustion chamber in accordance with either of the arrangements described above.

It will be understood that the nozzles to which coolant may be supplied by any one of the systems described above, may be in such number and so situated in the power unit as may be found advisable and with respect to the places where cooling is especially desirable. Thus they may be arranged to give a general cooling effect as when the coolant is delivered into the eye of the impeller in the manner described above with reference to Figure 1, or to give a more localised cooling effect as when the coolant is delivered from nozzles positioned in the combustion chamber or chambers as shown in the arrangement seen in Figure 5.

What I claim as my invention and desire to secure by Letters Patent is:

1. In a turbo-compressor power unit the combination of a casing enclosing the turbo compressor, a plurality of jet nozzles situated in this casing where a cooling medium issuing as a spray from these nozzles will be delivered into the air stream passing through the turbo-compressor, a pump driven by the turbo-compressor and supplying cooling medium to these nozzles, means for delivering fuel into the air stream passing through the turbo-compressor, and valve means actuated by the fuel pressure for controlling the delivery of the cooling medium.

2. In a turbo-compressor power unit the combination of a casing enclosing the turbo-compressor, a plurality of jet nozzles situated in this casing where a cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, and valve means for controlling the delivery of the cooling medium by the first said pump responsive to the delivery of fuel by the second said pump.

3. In a turbo-compressor power unit the combination of a casing enclosing the turbo-compressor, a plurality of jet nozzles situated in this casing where cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, and valve means actuated by changes in the pressure of the fuel supplied by said last named pump for controlling the delivery of cooling medium to said jet nozzles.

4. In a turbo-compressor power unit the combination of a casing enclosing the turbo-compressor, a plurality of jet nozzles situated in this casing where cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, and valve means responsive to variations in the fuel supply for effecting the automatic delivery of cooling medium to said first-named nozzles.

5. In a turbo-compressor power unit the combination of a casing enclosing the turbo-compressor, a plurality of jet nozzles situated in this casing where a cooling medium issuing from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, a by-pass in the delivery from the said pump which supplies cooling medium, a valve controlling this by-pass, a spring operative to maintain this valve on its seat, and means whereby the loading of this valve spring varies with the pressure of the fuel in the fuel supply system.

6. In a turbo-compressor power unit the combination of a casing enclosing the turbo-compressor, a plurality of jet nozzles situated in this casing where cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, and means controlled by the pressure of the fuel whereby when the supply of fuel to these latter nozzles is increased the said pump which delivers cooling medium will be caused to supply this medium to the nozzles for delivering said medium.

7. In a turbo-compressor power unit the combination of a casing enclosing the turbo-compressor, a plurality of jet nozzles situated in this casing where cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, a throttle valve controlling the delivery of cooling medium by the said first-named pump, a servo motor by which this throttle valve is operated, and means for controlling the operation of this servo motor by the pressure of the fuel in the piping through which fuel is delivered by said second-named pump to the said fuel nozzles.

8. A turbo-compressor power unit comprising the features as set out in claim 7 in which in addition to the control of the operation of the said servo motor by the pressure of the fuel as supplied to the said nozzles by the said fuel pump, means are provided for controlling the amount of fuel delivered by the said fuel pump, and means whereby the operation of the said servo motor is controlled in accordance with the amount of fuel which is being delivered by the said fuel pump as determined by the setting of the said means controlling the fuel pump delivery.

9. In a turbo-compressor power unit the combination of a casing enclosing the turbo-compressor, a plurality of jet nozzles situated in this casing where cooling medium issuing as a spray from these nozzles will be delivered into the air stream passing through the turbo-compressor, a pump driven by the turbo-compressor and supplying cooling medium to these nozzles, a plurality of nozzles situated within the said casing where fuel issuing from these latter nozzles will be delivered into the air stream passing from the compressor to the turbine, a pump driven by the turbo-compressor and supplying fuel under pressure to these latter nozzles, a by-pass for the delivery from the said pump which supplies cooling medium, means including a valve controlled by the pressure of fuel in the fuel supply piping for controlling the flow of medium through this by-pass, a throttle valve controlling the delivery of cooling medium by the said first-named pump, a servo motor by which this throttle is operated, means for controlling the operation of this servo motor by the pressure of the fuel in the said fuel supply piping, and means by which the operation of this servo motor is also controlled by the pressure of the air in the said casing as delivered by the compressor.

10. In a turbo compressor power unit, including combustion chamber, means for supplying fuel to said chamber including a pump and a conduit connecting its delivery with the chamber, and a second pump for delivering a coolant fluid to the chamber; a valve controlling delivery of coolant fluid to the chamber; a valve controlling delivery of coolant fluid by said second pump, and actuating means for said valves arranged for operation by pressure of the fuel in the said conduit.

FRANK BERNARD HALFORD.

REFERENCES CITED

The following references are of record in the file of this patent:

UNITED STATES PATENTS

| Number | Name | Date |
| --- | --- | --- |
| 864,821 | Zoelly | Sept. 3, 1907 |
| 974,457 | Backstrom | Nov. 1, 1910 |
| 1,064,665 | Moss | June 10, 1913 |
| 1,236,793 | Warman | Aug. 14, 1917 |
| 1,284,841 | Weiss | Nov. 12, 1918 |
| 1,418,444 | Josephs | June 6, 1922 |
| 1,442,876 | Hartman | Jan. 23, 1923 |
| 1,462,470 | Adamson | July 24, 1923 |
| 1,677,198 | Naileigh | July 17, 1928 |
| 2,078,958 | Lysholm | May 4, 1937 |
| 2,095,991 | Lysholm | Oct. 19, 1937 |

FOREIGN PATENTS

| Number | Country | Date |
| --- | --- | --- |
| 161,644 | Great Britain | Apr. 8, 1921 |